May 1, 1956 C. T. DALY ET AL 2,744,170

FAULT ALARM ARRANGEMENTS FOR ELECTRIC COMMUNICATION SYSTEMS

Filed Jan. 22, 1953 2 Sheets-Sheet 1

Inventor
C. T. DALY – R.C. JONES
By Philip M. Bolton
Attorney

FAULT ALARM ARRANGEMENTS FOR ELECTRIC COMMUNICATION SYSTEMS

Filed Jan. 22, 1953 2 Sheets-Sheet 2

Inventor
C.T. DALY – R.C. JONES
By Philip M. Bolton
Attorney 2,744,170
Patented May 1, 1956

2,744,170

FAULT ALARM ARRANGEMENTS FOR ELECTRIC COMMUNICATION SYSTEMS

Charles Trevor Daly and Robert Castle Jones, London, England, assignors to International Standard Electric Corporation, New York, N. Y.

Application January 22, 1953, Serial No. 332,602

Claims priority, application Great Britain February 4, 1952

5 Claims. (Cl. 179—175.31)

The present invention relates to an arrangement for locating defective stations in electric communication systems.

It is common practice in carrier wave communication systems to provide a number of unattended repeater stations spaced apart along a cable. With such an arrangement it is essential to provide means for signalling to an attended station information concerning the occurrence of a fault at any unattended station. In order that the fault may be cleared with the minimum of delay, it is necessary for an operator at the attended station to be able to locate the defective station without any uncertainty. Rather complicated arrangements have been proposed whereby the identity of the station at which a fault occurs is automatically transmitted to the attended saion, but a much simpler scheme has been used, whereby a fault at one of the stations causes an auxiliary wire to be connected to ground, thereby operating a fault alarm at the attended station. The operator then locates the defective station by measuring the resistance of the auxiliary wire as far as the point where it is connected to ground.

In the case of carrier communication systems operated over coaxial cables, the number of unattended stations between two attended stations may be very much greater than in earlier systems, and their spacing is much closer. As a result it happens that owing to the changes with temperature of the auxiliary wire, a defective station which is at a relatively great distance from the attended station cannot be located without ambiguity, since the temperature variation of resistance may be more than half the resistance of the wire between two adjacent stations.

The object of the present invention is to modify the above-described method of locating a defective station so that the above-mentioned ambiguity is avoided.

This object is achieved according to the invention by providing an arrangement for locating a defective station of an electric communication system having an attended station and a plurality of unattended stations spaced apart along a given route, comprising a circuit connecting the attended station to each of the unattended stations, means at each of the unattended stations adapted to operate in response to the occurrence of a fault thereat for terminating the said circuit, and means for measuring at the attended station the resistance of that portion of the terminated circuit between the defective station and a second unattended station which is nearer to the attended station than the said defective station.

Figure 1:
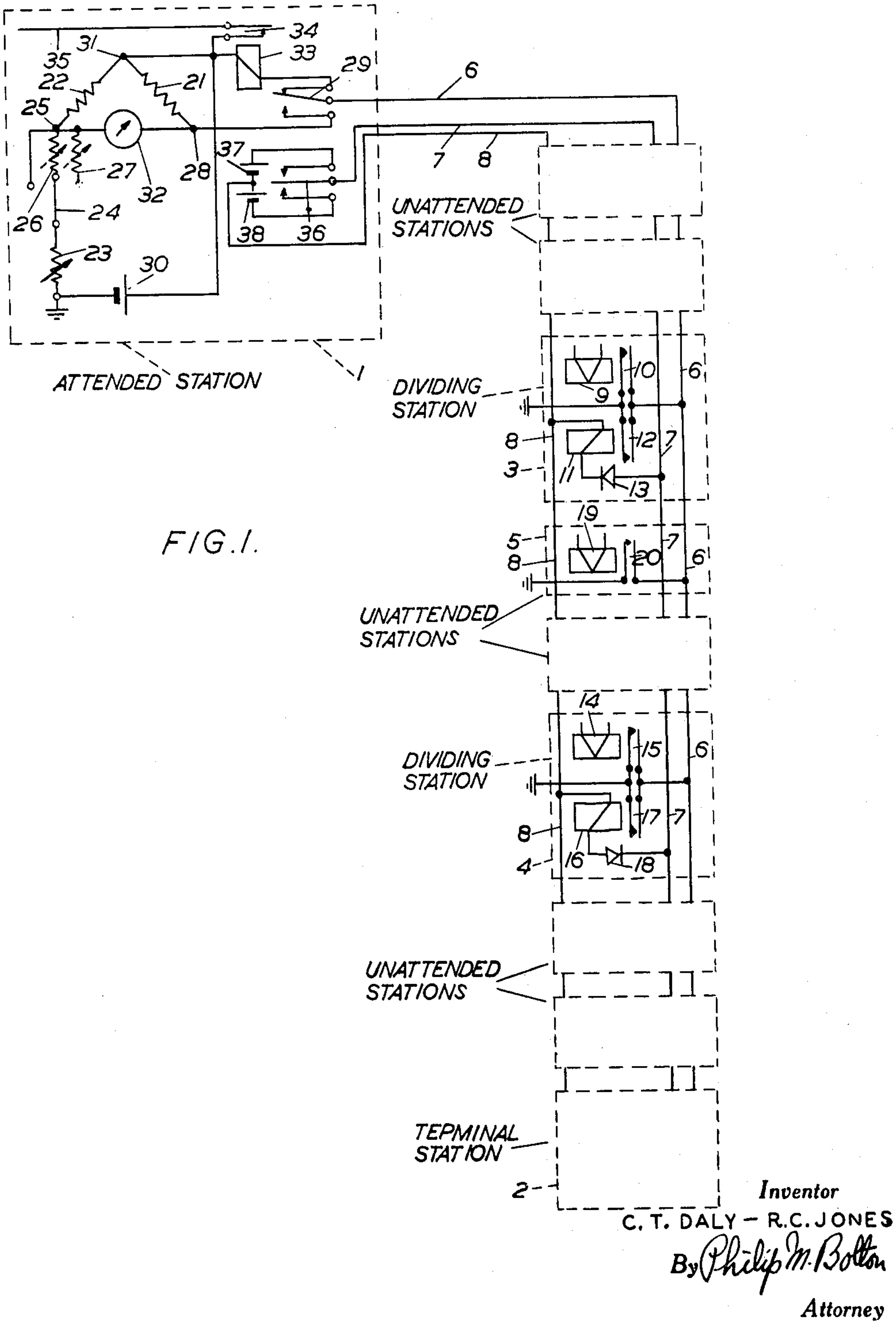
Figure 2:
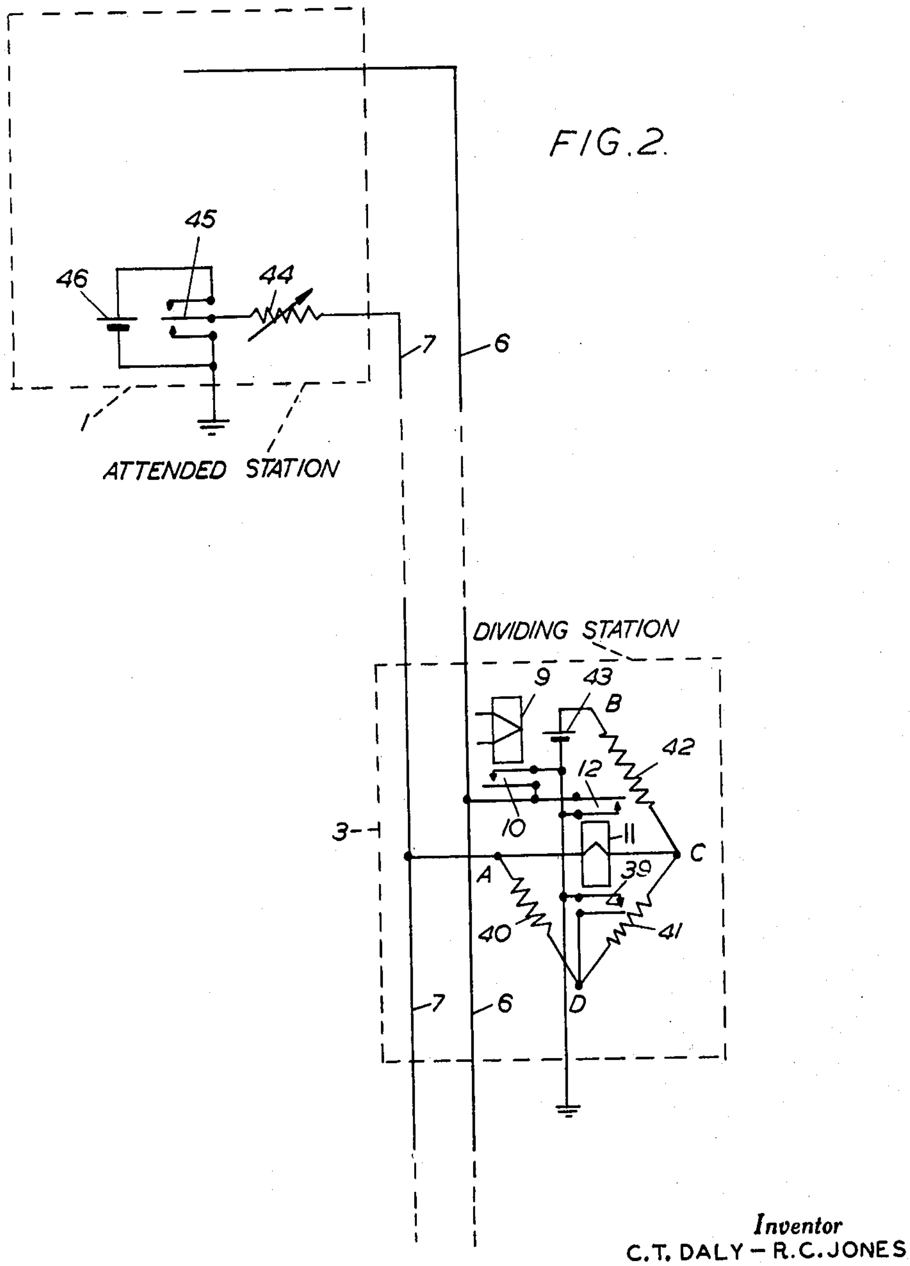

Figs. 1 and 2 of the accompanying drawing show schematic circuit diagrams of two arrangements according to the invention. In Fig. 1, two terminal stations 1, 2 may be supposed to be connected by a broadband carrier communication system operated over a coaxial cable circuit. The cable circuit and the carrier communication apparatus are not shown, and may take any suitable known form. Between the stations 1 and 2 are a relatively large number of unattended repeater stations. For clearness, it will be assumed that there are about sixty such stations, but the same principles may be applied to any number of such stations.

The unattended stations are divided into three groups by two stations, for example, the 20th and the 40th stations counting from station 1, designated 3 and 4 in the figure, and called "dividing stations," and between each pair of stations 1, 3, 4, 2 are nineteen other unattended stations, one of which is designated 5. All the unattended stations except 3 and 4 are similar to 5, and to save space only two of each group of nineteen are shown. It is not essential that the numbers of stations in the groups should be equal.

Three auxiliary wires 6, 7 and 8 connect stations 1 and 2, and also pass through all the unattended stations. These wires may, for example, comprise interstice wires stranded up with the coaxial conductors in the cable. At the dividing station 3 a fault alarm relay 9 will be operated, by means not shown, on the occurrence of a fault, and on operation it closes a pair of contacts 10 which connect the wire 6 to ground. A second relay 11 intended to be operated over wires 7 and 8 from station 1 by means to be explained later, closes contacts 12 which also connect the wire 6 to ground at station 3. The winding of relay 11 has one terminal connected to auxiliary wire 8 and the other to the auxiliary wire 7 through a rectifier 13.

The other dividing station 4 is equipped in the same way as station 3 with elements 14 to 18 similar respectively to elements 9 to 13, except that the rectifier 18 corresponding to 13 is connected in the reverse direction.

The unattended station 5 has a relay 19 with contacts 20 which connect the wire 6 to ground, arranged similarly to the relay 9 and contacts 10, but there is no relay or rectifier corresponding to 11 and 13. All the other unattended stations are similar to station 5.

At the attended station 1 there are provided the elements of a Wheatstone bridge, namely two equal resistance ratio arms 21, 22 and a third balancing arm comprising an adjustable resistor 23, which by means of a switch 24 is connected to the bridge corner 25 either directly, or through either of two additional adjustable resistors 26, 27. The fourth arm of the bridge is constituted by the auxiliary wire 6 which is connected to the bridge corner 28 through a switch 29, when the movable contact thereof is in the lower position. A battery 30, or other direct current source, connects the bridge corner 31 to ground, and corners 25 and 28 are connected by a galvanometer 32.

When the switch 29 is in the normal position shown, the auxiliary wire 6 will be connected to the source 30 through the winding of a relay 33, the contacts 34 of which, on being closed, connect the source 30 to a conductor 35 for operating a fault alarm (not shown) of some suitable character.

The auxiliary wire 7 is connected to the movable contact of a switch 36 for connecting it either to the positive terminal of a source 37 (when the movable contact is operated to the upper position) or to the negative terminal of a source 38 (when the movable contact is operated to the lower position). The remaining terminals of the sources 37 and 38 are each connected to the wire 8.

The circuit operates as follows. If a fault occurs at the station 5, which, for example, will be assumed to be the 27th unattended station, counting from station 1, then relay 19 will operate, and will connect the wire 6 to ground. This will operate relay 33 at station 1 thereby giving an alarm. The operator at station 1 then proceeds to locate the station at which the fault has occurred. He will first operate switch 29 to the lower position, thus disconnecting the relay 33 and switching off the alarm. The wire 6 is now connected to the Wheatstone bridge, and the operator then measures its resistance. He will at once discover that the defective station is between stations 3 and 4, and he therefore sets the switch 24 to the centre position, as shown, and reduces resistor 23 to zero. He operates switch 36 to the upper position, thus operating relay 11 at station 3 over conductors 7 and 8 from source 37, the rectifier 13 having been connected so that it is in the low resistance condition when connected to source 37. Relay 11 connects the wire 6 to ground at station 3, and the operator then balances the bridge by adjusting resistor 26. The section of wire 6 as far as the station 3 has thereby been accurately balanced out. Switch 36 is now restored to normal, thus removing the ground connection at station 3. The ground connection at station 5 however remains, and the operator then re-balances the bridge by adjusting resistor 23. The reading of this resistor then gives approximately the distance between the station 4 and the station 5 at which the fault has occurred, there being no error resulting from the section of the wire 6 as far as the station 3. If the distance between stations 3 and 4 is chosen sufficiently small, so that the extreme temperature variation of the section of the wire 6 between stations 3 and 4 is considerably less than half the resistance between two adjacent stations, a defective station will be located in this way without any ambiguity.

If the defective station has been for example the fifty-fourth, the preliminary test would show that the defective station was between stations 4 and 2, and the operator would then operate the switch 36 to the lower position, thus connecting the wire 7 to the source 38. In this case the relay 16 at station 4 will be operated instead of relay 11 at station 3, thereby connecting the auxiliary wire 6 to ground at station 4. This is because the rectifier 18 will now be in the low resistance condition while the rectifier 13 will be in the high resistance condition.

The operator now balances out the section of the wire 6 as far as station 4 by first reducing resistor 23 to zero, and then balancing the bridge using adjustable resistor 27, after having set the switch 24 on the right-hand contact. On releasing the switch 36, the relay 16 will remove the ground connection at station 4, and then the bridge is rebalanced by means of the resistor 23, the latter then gives approximately the distance between the station 4 and the defective station.

If the defective station is between stations 1 and 3, the temperature error is insufficient to introduce any ambiguity and in that case switch 24 is set on the left-hand contact, thus connecting resistor 23 directly to the corner 25. The bridge is then balanced as before by adjusting the resistor 23, from the reading of which the distance to the defective station can be determined.

If the number of unattended stations and their spacing is such that more than two dividing stations similar to 3 and 4 must be used if ambiguity is to be avoided, then some suitable arrangement for selectively operating all the relays similar to 11 or 16 will be required. The scheme suggested could, for example, be repeated by the use of one or more additional pairs of interstice wires similar to 7 and 8, or an entirely different method could be adopted. The scheme illustrated is probably the simplest possible for two dividing stations.

The adjustable resistors 26, 27 might each comprise a fixed portion whose resistance is slightly less than the minimum resistance of the auxiliary wire 6 as far as the corresponding dividing station 3 or 4, and a variable portion of total resistance sufficient to cover the extreme resistance variation of the auxiliary wire. The total range of the adjustable resistor 23 should slightly exceed the maximum resistance of the auxiliary wire 6 between any two adjacent pairs of the stations 1, 3, 4, 2. If desired, the resistor 23 could be provided with a scale graduated with the numbers of the unattended stations counting from station 1, or from the previous dividing station, so that the number of a defective station could be read off directly without any calculation.

It should be added that instead of using earth return for the auxiliary wire 6, a third wire (not shown) could be used, connecting the junction point of elements 23 and 30 of station 1 to all the unattended stations, the relays 9, 14, and 19 at these stations being arranged to short-circuit or otherwise terminate the two wires concerned. This might be desirable if earth currents of sufficient magnitude to upset the resistance measurements are present.

In the arrangement shown in Fig. 1, the wire 8 is provided to avoid the use of a ground return for the current which operates the relay 11 or 16. The ground current would otherwise upset the reading of the Wheatstone bridge, and would be likely to introduce an error in the measurement of the resistance of the wire 6 as far as the dividing station sufficient to produce an ambiguity in locating the defective station. However, by the modified arrangement shown in Fig. 2, the wire 8 may be replaced by a ground return without interfering with the bridge, since in this arrangement no current flows from station 1 over the wire 7 when the resistance to the dividing station is being measured. The arrangement shown in Fig. 2, however, is only adapted to operate with a single dividing station, and if there are two, as in Fig. 1, the location of a defective station between stations 4 and 2 should be carried out from station 2.

In Fig. 2 only the attended station 1 and the dividing station 3 are shown, and also the interstice wires 6 and 7. Wire 8 of Fig. 1 is not required and is not shown. Wires 6 and 7 are shown with dotted portions to indicate the presence of any number of unattended stations (not shown in Fig. 2) similar to 5, Fig. 1. Elements 21 to 35 at station 1 associated with wire 6 are also not shown in Fig. 2 since they may be exactly as shown in Fig. 1.

At station 3 in Fig. 2, the relays 9 and 11 are provided as in Fig. 1, and have contact sets 10 and 12 for connecting the wire 6 to ground, as before. The relay 11 is however provided with an additional set of contacts 39. Three resistors 40, 41 and 42 form respectively three of the arms of a bridge network ABCD, and the winding of relay 11 is connected in the position of the galvanometer between the extremities A, C of the resistors 40 and 41. The contacts 39 connect the junction point D of resistors 40 and 41 to ground when the relay 11 is operated. A direct current source 43 connects the upper end B of resistor 42 to ground. Wire 7 is connected to corner A.

At the attended station 1, wire 7 is connected through an adjustable resistor 44 to the movable contact of a switch 45, the lower fixed contact of which is connected to ground, and the upper fixed contact of which is connected to one terminal of a direct current source 46, the other terminal of which is connected to ground. Source 30 of Fig. 1 could be used as the source 46 is desired. It is necessary, however, that the sources 43 and 46 should have terminals of the same polarity connected to ground, and their potentials should preferably, though not essentially, be equal.

It will be seen that when the switch 45 is operated to the lower position, ground will be connected over resistor 44 and the wire 7 to the corner A of the bridge at station 3. This will cause the operation of the relay 11 from source 43 through resistor 42, the relay being shunted by resistors 40 and 41 in series. The operation of relay 11 by closing the contacts 12 connects ground to the wire 6, as before, and by operation of the contacts 39 also connects ground to corner D. If the key 45 at station 1 is now returned to the central position shown, the relay 11 at station 3 will be held operated from source 43 through the closed contacts 39, but this time resistor 40 is in series with relay 11, the combination being shunted by resistor 41. The resistance and sensitivity of the relay can evidently be chosen so that it will be reliably operated under both these conditions.

The key 45 having been released, no current now flows through the wire 7, and the measurement of the resistance of the wire 6 as far as the station 3 can be carried out from station 1 in the manner already explained without any error from the return current of wire 7 through the earth.

When the measurement has been made, the relay 11 can be released by operating the key 45 to the upper position, which connects the source 46 through resistor 44 to corner A of the bridge at stations 3. In this condition, the bridge is completed by adding the fourth arm, which is effectively constituted by the combined resistance of the wire 7 and resistor 44, the sources 43 and 46 operating in parallel. It is evidently possible to adjust resistor 44 so that the bridge is substantially balanced in this condition, and substantially no current then flows through the relay 11, which will be released, thus disconnecting corner D of the bridge from ground. Thus when the key 45 is restored to its central position, the relay 11 remains released.

The adjustment of resistor 44 to balance the bridge can be determined by a preliminary test when first setting up the circuit, but it will be evident that subsequent temperature variations of the resistance of the wire 7 will destroy the balance to some extent. However, if the resistors 40, 41 and 42 are chosen to be large compared with resistance of wire 7 as far as the station 3, and if the relay 11 be designed to have a small margin between the operate and release currents, these temperature variations can be rendered ineffective.

It should be pointed out that if the potentials of the sources 43 and 46 are different, the resistor 44 can still be adjusted to produce substantially no current in the relay 11 when the key 45 is in the upper position.

It will be noted that operation of the key 45 to the up and down positions is equivalent to transmitting two different signals along the wire 7, since the current flows through the wire in opposite directions for the two positions of the key.

While the principles of the invention have been described above in connection with specific embodiments and particular modifications thereof, it is to be clearly understood that this description is made only by way of example and not as a limitation on the scope of the invention.

What we claim is:

1. An arrangement for locating a defective station of an electric communication system having an attended station and a plurality of unattended stations spaced apart along a given route, comprising a circuit connecting the attended station to each of the unattended stations, means at each of the unattended stations operable in response to the occurrence of a fault thereat for terminating said circuit, and means for measuring at the attended station the resistance of the terminated circuit between the defective station and a second unattended station which is nearer to the attended station than said defective station.

2. An arrangement according to claim 1 comprising a Wheatstone bridge at the attended station for measuring the resistance of the terminated circuit, a second circuit connecting the attended station to said second unattended station, means located at said second unattended station and controllable over said second circuit from the attended station for terminating the first-mentioned circuit at said second unattended station, a first adjustable resistor in the balancing arm of the said Wheatstone bridge for balancing the resistance of the first-mentioned circuit as far as said second unattended station, and a second adjustable resistor in the said balancing arm for balancing the resistance of the remaining portion of the first-mentioned circuit.

3. An arrangement for locating a defective station of an electric communication system having an attended station and a plurality of unattended stations spaced apart along a given route, certain unattended stations distributed along the route being called dividing stations, comprising a first auxiliary conductor connecting the attended station to all the unattended staions, a second auxiliary conductor connecting the attended station to all the dividing stations, means at each of the unattended stations operable in response to the occurrence of a fault thereat for connecting the first auxiliary conductor to ground, means located at each of the dividing stations and selectively controllable from the attended station over the second auxiliary conductor for connecting the first auxiliary conductor to ground, a Wheatstone bridge at the attended station for measuring the resistance of the first auxiliary conductor as far as the point of connection to ground, a plurality of separately selectable adjustable resistors corresponding respectively to the dividing stations and forming part of the balancing arm of said Wheatstone bridge, each adjustable resistor being provided for the purpose of balancing out the resistance of the first auxiliary conductor as far as the corresponding dividing station, and an additional adjustable resistor in said balancing arm provided for the purpose of measuring resistance of the said first conductor between the defective station and dividing station nearest thereto on the side towards the attended station.

4. An arrangement according to claim 2 in which said second circuit comprises a conductor and a ground return, comprising means for transmitting a first signal over the second circuit to said second unattended station for effecting the termination of the first-mentioned circuit thereat, and means for transmitting a different signal over said second circuit for removing the termination of the first mentioned circuit, whereby in the interval between the transmission of said signals no current flows in said second circuit.

5. An arrangement according to claim 4 comprising at the second unattended station a bridge network having two pairs of diagonally opposite corners A, C, and B, D, respectively, three resistors respectively occupying the arms BC, CD, and DA, the winding of a relay connected between A and C, a direct current source having one terminal of given polarity connected to ground and the other terminal to corner B, a set of contacts controlled by the relay winding and adapted on operation to connect the corner D to ground, a second set of contacts controlled by the relay winding, and operable to terminate the first-mentioned circuit at said second unattended station, and means for connecting the said conductor to corner A; and at the attended station a switch operable to connect the said conductor through a fourth resistor either to ground or to a second direct current source having the terminal of the given polarity connected to ground, the resistance of the fourth resistor being so chosen that when the said conductor is connected by means of the switch to ground for operating said relay and afterwards to said source, the current through the relay winding is then reduced below the value of release current for the relay, thereby releasing the relay.

References Cited in the file of this patent

UNITED STATES PATENTS

| | | |
|---|---|---|
| 1,699,415 | Wetzel | Jan. 15, 1929 |
| 2,070,671 | Meissner | Feb. 16, 1937 |
| 2,260,160 | Benning et al. | Oct. 21, 1941 |
| 2,307,896 | Neiswinter | Jan. 12, 1943 |